United States Patent [19]

Winter

[11] Patent Number: 5,020,840
[45] Date of Patent: Jun. 4, 1991

[54] GATE LATCH

[76] Inventor: Clarence P. Winter, 11169 Rte. 75 at Langford, North Collins, N.Y. 14111

[21] Appl. No.: 551,027

[22] Filed: Jul. 11, 1990

[51] Int. Cl.⁵ .......................................... E05C 17/36
[52] U.S. Cl. ..................................... 292/264; 24/701
[58] Field of Search .................. 24/701; 292/292, 264, 292/302

[56] References Cited

U.S. PATENT DOCUMENTS

| | | | |
|---|---|---|---|
| 257,986 | 5/1882 | Skerrett | 292/264 |
| 878,294 | 2/1908 | Kleidmann | 292/264 |
| 880,214 | 2/1908 | Henninges | 292/264 |
| 890,518 | 6/1908 | Kleidmann | 292/264 |
| 1,325,538 | 12/1919 | Smith | 292/264 |
| 2,036,679 | 4/1936 | Bourn | 292/264 |
| 2,554,759 | 5/1951 | Vickers | 292/264 |
| 2,803,899 | 8/1957 | Denovan | 39/74 |
| 2,816,431 | 12/1957 | Harney | 70/93 |
| 2,985,476 | 5/1961 | Tiffany | 292/264 X |
| 3,473,598 | 10/1969 | Winter et al. | 160/328 |
| 3,720,431 | 3/1973 | Oliver et al. | 292/264 |
| 4,254,975 | 3/1981 | Miller | 292/264 |
| 4,447,081 | 5/1984 | Stottlemyre | 292/264 |

Primary Examiner—Richard E. Moore
Attorney, Agent, or Firm—Joseph P. Gastel

[57] ABSTRACT

A gate latch including an anchoring member for mounting on a gate post, a chain having one end mounted on the anchoring member and having a latching tab mounted on its other end, a keeper mounted on the gate post, the keeper having a shank with a horizontal portion and a vertical portion extending upwardly therefrom, an enlarged conical head on the vertical portion of the shank, and a keyhole-shaped aperture in the latching tab which is of a size which will pass over the enlarged head of the keeper only when it is tilted beyond a predetermined position relative thereto, the keyhole including a smaller portion which receives the horizontal portion of the shank of the keeper, and the latching tab being connected to the chain proximate the portion of the keyhole which receives the enlarged head so that the latching tab gravitates so that the smaller portion of the aperture receives the horizontal portion of the keeper shank.

12 Claims, 2 Drawing Sheets

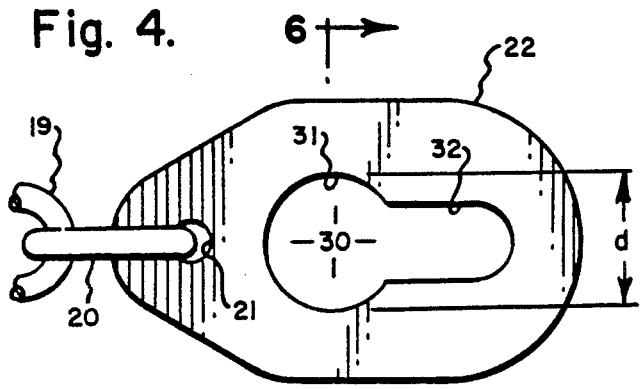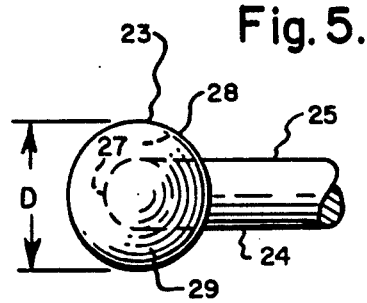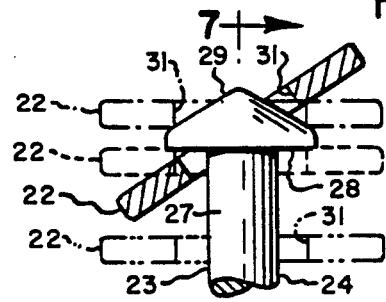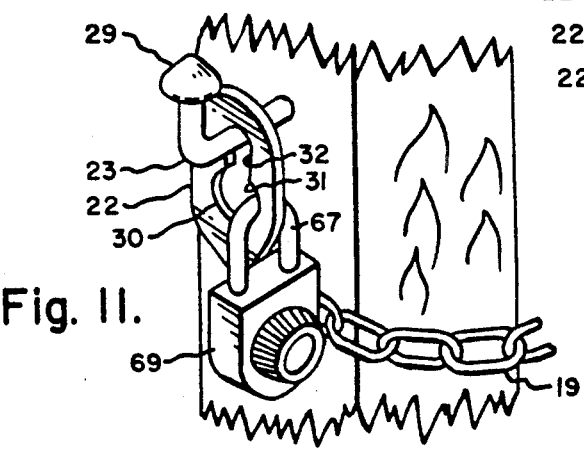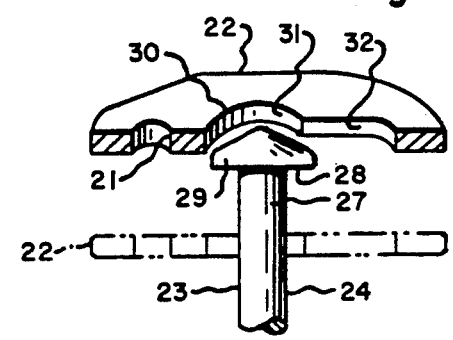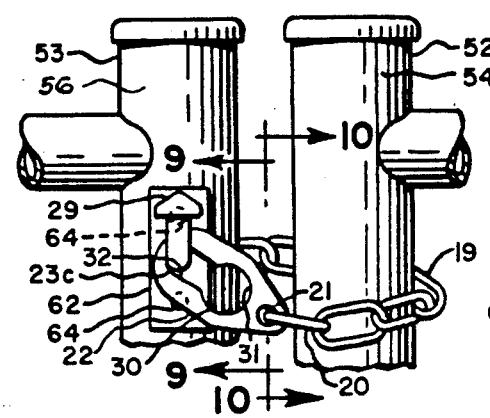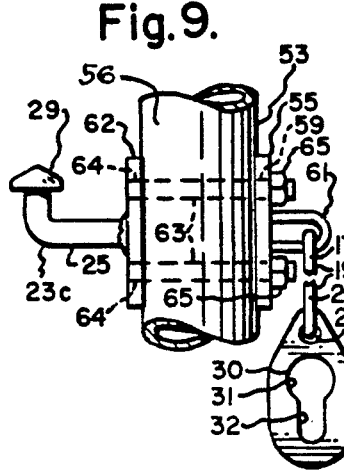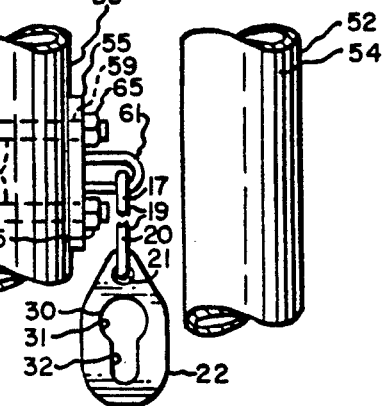

GATE LATCH

BACKGROUND OF THE INVENTION

The present invention relates to an improved gate latch for farm gates or the like.

As is well known, it is necessary to latch farm gates against opening. In the past numerous devices have been used for this purpose. However, many were relatively complicated and expensive to fabricate. Others were difficult to operate. Still others could be easily unlatched.

SUMMARY OF THE INVENITON

It is one object of the present invention to provide an improved gate latch which is virtually impossible for a farm animal to unlatch because a compound motion is required.

Another object of the present invention is to provide an improved gate latch which is simple to fabricate, easy to install and reliable in operation.

A further object of the present invention is to provide an improved gate latch which can be locked in latching position by the use of a padlock. Other objects and attendant advantages of the present invention will readily be perceived hereafter.

The present invention relates to a gate latch comprising keeper means for attachment to a gate post, a shank on said keeper means, an enlarged head on said shank, an elongated flexible member, anchoring means at one end of said elongated flexible member for attaching said elongated flexible member to said gate post, latching tab means on the opposite end of said elongated flexible member for attachment to said keeper means, and aperture means in said latching tab means of a size which will permit said latching tab to pass over said enlarged head onto and off of said shank only when said tab means are tilted to a predetermined position relative to said enlarged head but will not pass over said enlarged head until it is tilted to said predetermined position.

The various aspects of the present invention will be more fully understood when the following portions of the specification are read in conjunction with the accompanying drawings wherein:

BRIEF DESCRIPTION OF THE DRAWINGS

FIG. 4 is a fragmentary plan view of the locking tab of the embodiments of FIGS. 1-3;

FIG. 5 is a fragmentary plan view of the keeper which receives the locking tab;

FIG. 6 is a fragmentary cross sectional view taken substantially along line 6—6 of FIG. 4 and showing the dimensional relationship between the locking tab and the head of the keeper when they are in a position wherein the locking tab will not pass over the head;

FIG. 7 is a cross sectional view similar to FIG. 6 but showing the locking tab tilted so as to pass over the head of the keeper;

FIG. 8 is a fragmentary elevational view showing a still further embodiment for use with two swinging gates which are to be latched to each other;

FIG. 9 is a fragmentary view taken substantially in the direction of arrows 9—9 of FIG. 8;

FIG. 10 is a fragmentary view taken substantially in the direction of arrows 10—10 of FIG. 8; and FIG. 11 is a fragmentary perspective view showing how a lock may be mounted on the latching tabs of any of the preceding embodiments for the purpose of preventing the latching tab from being removed from the keeper.

DESCRIPTION OF THE PREFERRED EMBODIMENTS

Figure 1:
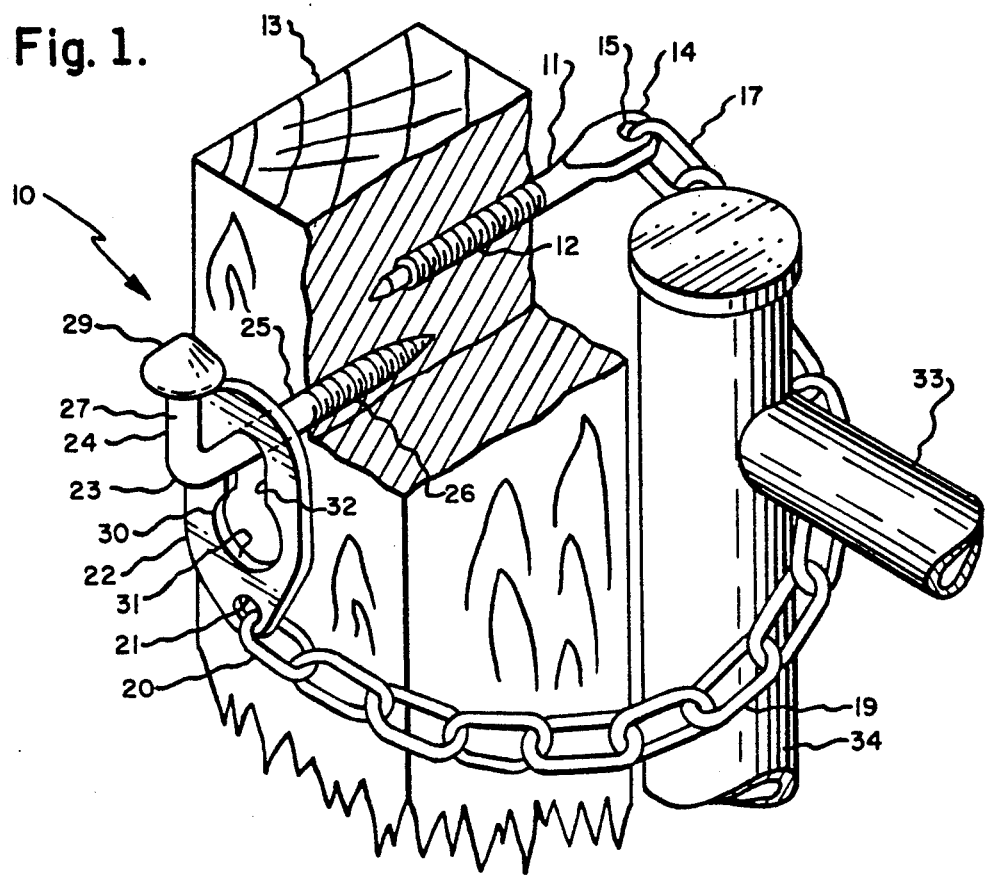
FIG. 1 is a fragmentary view, partially broken away, showing the improved gate latch used in conjuction with a wooden post.

One embodiment of the present invention is disclosed in FIGS. 1 and 4–7. The improved gate latch 10 includes an anchoring member 11 having a threaded shank 12 for screwing into wooden gate post 13. The end 14 of anchoring member 11 is flattened and it has an aperture 15 therein for movably receiving the end link 17 of chain 19. The opposite end link 20 of chain 19 movably extends through aperture 21 of latching tab 22. A keeper 23 includes a shank 24 having a horizontal portion 25 with threads 26 thereon which are used to screw horizontal portion 25 into gate post 13. The keeper 23 also includes a vertical shank portion 27 having enlarged conical head 29 having a base 28 (FIG. 6) which is located at the upper end of portion 27. Latching tab 22 includes a keyhole shaped aperture 30 having a larger portion 31 and a smaller portion 32.

In operation, when gate 33 is to be latched to gate post 13, the chain 19 is placed around the vertical end member 34 of the gate, as shown in FIG. 1, and the latching tab is mounted onto shank 24 of anchoring member 23. However, in order to effect such mounting, latching tab 22 has to be manipulated in the proper manner. More specifically, the maximum diameter D of base 28 of enlarged conical head 29 is larger than the diameter d of larger keyhole portion 31. Therefore, as can be seen from FIG. 6, the latching tab 22 will not fit over enlarged head 29 when the latter is oriented horizontally. It is only when it is tilted beyond the horizontal position of FIG. 6, such as shown in FIG. 7, that the enlarged head 29 can be pressed through aperture 31 and the adjacent portion of aperture portion 32 so that it will move down to the dot-dash position of shank portion 27. More importantly, however, is the fact that the latching tab 22 cannot be removed from shank portion 27 when it is in a dotted line horizontal position of FIG. 7 because the diameter d of aperture portion 31 is smaller than the diameter D of conical head 29. Therefore, in order to remove latching tab 22 from keeper 23, it must again be tilted to a predetermined position wherein it can be passed over enlarged head 29. In this respect, the keeper head must be primarily located in the larger aperture portion 31 with a portion of the keeper head extending into smaller aperture portion 32, considering that aperture postion 32 is not wide enough to permit the keeper head 29 to pass therethrough, even in a titled attitude. Thus, it is almost impossible for a farm animal to manipulate latching tab 22 in such a manner as to remove it from keeper 23.

Since the chain link 20 is secured to latching tab 22 closer to the larger aperture portion 31 than to the smaller aperture portion 32, after the latching tab 22 has been manipulated in the foregoing manner to pass over enlarged keeper head 29 and onto shank 23, the gravitational force of the chain on latching tab 22 will cause it to automatically assume the postion shown in FIG. 1 wherein the horizontal shank portion 25 is received in smaller aperture portion 32. Therefore, in order to remove the tab 22 from shank 23 an initial manipulation is required to align the larger aperture portion 31 with enlarged keeper head 29 before the additional manipulation of tilting latching tab 22 is effected, as described above relative to FIG. 7, before it can pass over the keeper head 29. It is virtually impossible for a farm animal to maipulate latching tab 22 in the above-described compound manner to remove it from keeper 23. Yet a person who has the knowledge of how the latching tab 22 can be removed from keeper 23 can remove it very easily.

Figure 2:
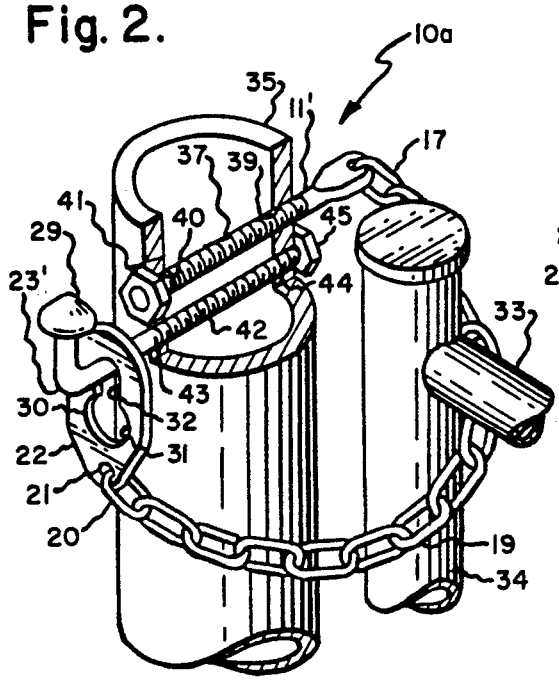
FIG. 2 is a fragmentary view, partially broken away away, showing another embodiment of the improved gate latch used in conjuction with a steel post.
Figure 3:
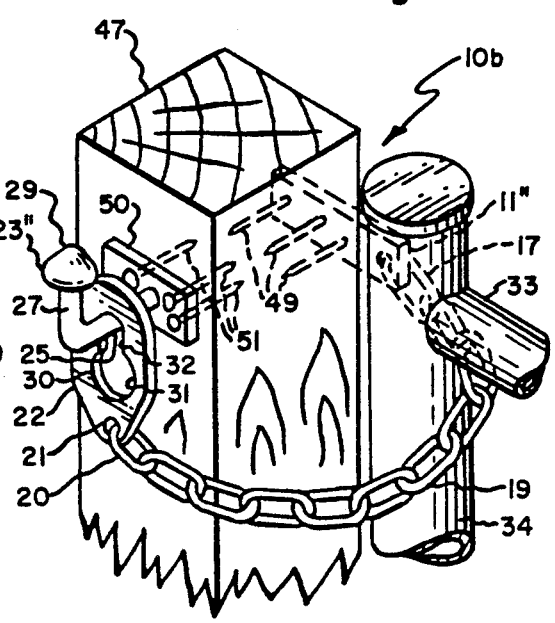
FIG. 3 is a fragmentary view showing still another embodiment of the improved gate latch used in conjuction with a wooden post.

Another embodiment of the present invention is disclosed in FIG. 2 for use on a metal gate port post 35. In this respect, the only difference between the embodiment 10 of FIG. 1 and the embodiment 10a of FIG. 2 is in the configuration of the portions of the anchoring member 11' and the keeper 23'. In this respect, the shank portion 37 of anchoring member 11' is intended to pass through holes 39 and 40 in metal gate post 35, and it is intended to be secured by a nut 41. Apertures 39 and 40 may be tapped to receive the threaded portion of the shank. The threaded portion 42 of keeper 23' is intended to pass through apertures 43 and 44 of gate post 35 and is intended to be secured by nut 45. Apertures 43 and 44 may be tapped. Aside from the foregoing, all of the other elements of structure of gate latch 10a are identical to the structure described above relative to FIGS. 1 and 4–7 and the same numerals are used for Another embodiment of the present invention is disclosed in FIG. 3. The gate latch 10b includes the same basic elements as the previous embodiments. However, the chain 19 and keeper 23" are secured to wooden gate post 47 in a different manner. More specifically, the end link 17 is secured to an anchoring member 11" which is in the shape of a rectangular metal plate which is secured to gate post 47 by a plurality of screws or nails 49. The keeper 23" includes an enlarged head 29, a vertical shank portion 27, and a horizontal shank portion 25 which has its outer end welded or otherwise suitably secured to plate 50 which is secured to wooden gate post 47 by a plurality of nails or screws 51. Aside from the foregoing differences, the gate latch 10b has the same parts as those of the pervious embodiments.

A still further embodiment of the present invention is disclosed in FIGS. 8–10. This embodiment is for the purpose of latching the adjacent outer ends of swingable gates 52 and 53 to each other. Gates. 52 and 53 are usually about 10 feet wide and are hinged at their ends which are remote from the ends shown in FIG. 8. Gate 52 includes a vertical end frame member 54. Gate 53 also has an end frame member 56. A loop 61 is welded to the outer surface of plate 55, and link 17 of chain 19 is mounted on loop 61. The outer end of chain 19 has a link 20 which mounts tab 22 which is identical to the like-numbered tab of the preceding figures. The keeper 23c includes a plate 62 which has first ends 64 of studs 63 welded thereto, and these studs pass through suitable apertures in gate frame member 53 and through apertures 59 in plate 55 which mounts loop 61. Nuts 65 are threaded onto studs of 63 to thus secure plates 62 and 55 to diametrically opposite sides of member 56. The horizontal portion 25 of keeper 23c is welded to plate 62. The relative dimensions between the mating portions of keeper 23c and latching tab 22 are identical to those described above relative to the preceding figures. In use, in order to latch and unlatch gates 52 and 53 from each other, the chain 19 is wound around gate member 54, as shown in FIG. 8, and latching tab 22 is manipulated relative to keeper 23c in the manner described above relative to the preceding figures to mount it thereon.

The improved gate latch of all of the embodiments described above can be used with a padlock 69, as depicted in FIG. 11, to prevent removal of latching tab 22 from the keeper 23. All that is necessary is to pass the shackle 67 of padlock 69 through aperture 31 of latching tab 22.

While the aperture 30 of the latching tab has been shown to be of a keyhole shape, it will appreciated that it can be of other shapes and still operate in substantially the same manner. For example, it may be in the shape of an elongated slot of substantially uniform width wherein the width is sufficiently large to permit the keeper head to pass therethrough in manner described above in conjunction with FIG. 7. Also, the aperture may have a larger portion and a smaller portion which are analogous to the portions 31 and 32, respectively, of the keyhole aperture. Also, it will be appreciated that the keeper head need not be of conical shape, but may be any other shape which will function in a manner analogous to that of the conical head. Furthermore, while the above description has referred to a chain, it will be appreciated that any flexible elongated member, such as a cable, can serve equally well. In addition to the foregoing, it may be desirable under certain circumstances not to require the latching tab 22 to be tilted for mounting and demounting it, but it may be desirable to have the latching tab gravitate on the shank to the positions of FIGS. 1–3. In this instance aperture portion 31 may be made large enough to receive the keeper head in its entirety and portion 32 may be slightly larger than the shank.

While preferred embodiments of the present invention have been disclosed, the present invention is not limited thereto but may be otherwise embodied within the scope of the following claims.

What is claimed is:

1. A gate latch comprising keeper means for attachment to a gate post, a shank on said keeper means, an enlarged head on said shank, an elongated flexible member, anchoring means at one end of said elongated flexible member for attaching said elongated flexible member relative to said gate post, latching tab means on the opposite end of said elongated flexible member for attachment to said keeper means, and aperture means in said latching tab means, said aperture means having a larger portion which is smaller than said enlarged head and through which said enlarged head cannot pass and said aperture means having a smaller portion which is a continuation of said larger portion and which is also smaller than said enlarged head and through which said enlarged head cannot pass, said enlarged head being capable of passing through said aperture means only when it passes through said larger portion of said aperture means and an adjacent portion of said smaller portion of said aperture means and only when said latching tab means is tilted to a predetermined position relative to said enlarged head during mounting on and demounting from said shank on said keeper means.

2. A gate latch comprising a keeper having a shank and an enlarged head on said shank, said shank including a horizontal portion and a vertical portion forming an extension of said horizontal portion, means on the end of said horizontal portion for securing said horizontal portion relative to a gate member, said enlarged head being in the shape of a cone having a base connected to the end of said vertical portion said shank, a latching tab for mounting on said keeper, said latching tab having a keyhole-shaped aperture having a larger portion of circular shape and a smaller portion of elongated shape forming a continuation of said larger portion, said base of said cone being larger than said larger portion of circular shape of said aperture and also being of a size too larger to fit through said smaller portion of said aperture so that said latching tab can pass over said enlarged head only when said enlarged head simultaneously passes through said larger portion of said aperture and an adjacent portion of said smaller portion of said aperture and said latching tab is tilted so that a portion of said base is one of the first portions of said enlarged head to pass through said aperture, an elongated flexible member having first and second ends, means on said first end of said elongated flexible member for attachment relative to said gate member, and means on said second end of said elongated flexible member for attachment to said latching tab proximate said larger portion of said latching tab, said horizontal portion of said shank being of smaller size than said smaller portion of said aperture whereby said attachment of said elongated flexible member to said latching tab proximate said larger portion of said aperture causes said latching tab to gravitate to a position wherein said latching tab comes to rest with said smaller portion of said aperture receiving said horizontal portion of said shank.

3. A gate latch as set forth in claim 1 wherein said shank includes a shank portion immediately adjacent said enlarged head which is to be oriented in a vertical direction and below said enlarged head when said keeper means is mounted on said gate post.

4. A gate latch as set forth in claim 1 wherein said smaller portion of said aperture means is of a size to receive said shank.

5. A gate latch as set forth in claim 4 wherein said opposite end of said elongated flexible member is secured to said latching tab proximate said larger portion of said aperture means whereby said latching tab will automatically gravitate to a position wherein said smaller portion of said aperture means receives said shank.

6. A gate latch as set forth in claim 4 wherein said shank includes a first shank portion immediately adjacent said enlarged head which is to be oriented in a vertical direction and below said enlarged head when said keeper is mounted on said gate post, and a second shank portion remote from said enlarged head which is to be oriented in a more horizontal direction than said first shank portion.

7. A gate latch as set forth in claim 1 wherein said enlarged head is substantially conical, a base on said substantially conical head, and wherein said shank is attached to said base and extends away therefrom, and wherein said larger portion of said aperture means is smaller than said base of said substantially conical head.

8. A gate latch as set forth in claim 7 wherein said smaller portion of said aperture means is of a size to receive said shank.

9. A gate latch as set forth in claim 8 wherein said elongated flexible member is secured to said latching tab proximate said larger portion of said aperture means whereby said latching tab will automatically gravitate to a position on said keeper means to receive said shank in said smaller portion of said aperture means.

10. A gate latch as set forth in claim 9 wherein said elongated flexible member is a chain.

11. A gate latch as set forth in claim 1 wherein said enlarged head includes a base which is attached to said shank and which also includes a portion of a size which diminishes in diameter as it extends away from said base.

12. A gate latch as set forth in claim 11 wherein said shank is attached to said base.

* * * * *

UNITED STATES PATENT AND TRADEMARK OFFICE
CERTIFICATE OF CORRECTION

PATENT NO. : 5,020,840
DATED : June 4, 1991
INVENTOR(S) : Clarence P. Winter It is certified that error appears in the above-identified patent and that said Letters Patent is hereby corrected as shown below:

Column 2, line 45, change "pressed" to --passed--;
          line 47, before "shank" change "of" to --on--;
          line 59, change "postion" to --portion--.
Column 3, line 1, change "postion" to --position--;
          line 16, delete "port";
          line 31, after "for" insert --these parts.--;
          line 63, delete "of".
Column 4, line 14, after "will" insert --be--;
          line 19, after "in" insert --the--;
          line 25, after "be" insert --of--.
Column 5, line 4 (claim 2), after "portion" insert --of--.

Signed and Sealed this

Thirteenth Day of October, 1992

*Attest:*

DOUGLAS B. COMER

*Attesting Officer*        *Acting Commissioner of Patents and Trademarks*